June 16, 1942.  W. VAN TRIEST  2,286,591
METHOD OF SCARFING
Filed March 30, 1940
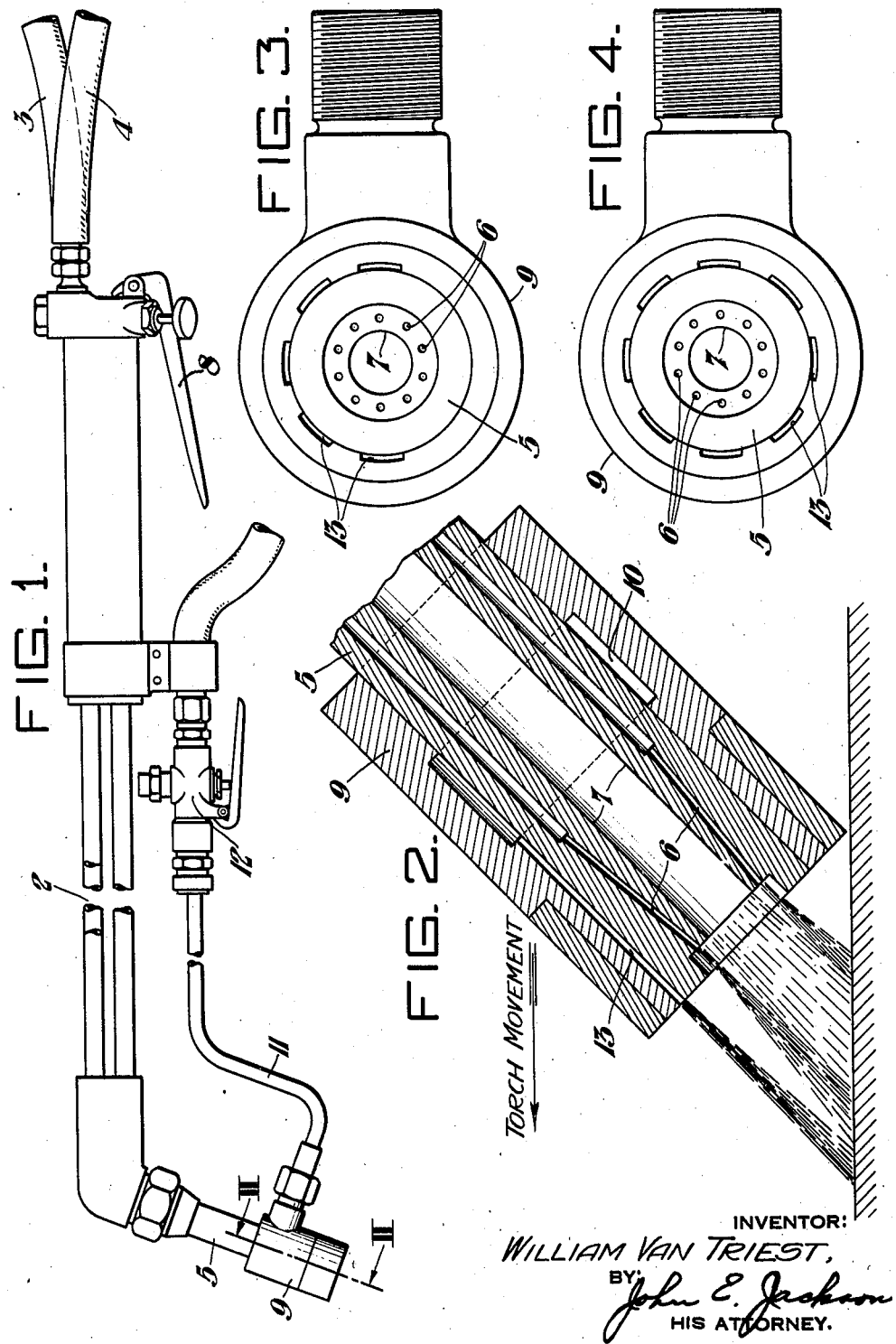
INVENTOR:
WILLIAM VAN TRIEST,
BY John E. Jackson
HIS ATTORNEY.

Patented June 16, 1942

2,286,591

UNITED STATES PATENT OFFICE 2,286,591

METHOD OF SCARFING

William Van Triest, Pittsburgh, Pa.

Application March 30, 1940, Serial No. 326,980

2 Claims. (Cl. 148—9)

This invention relates to improvements in the method of scarfing steel blooms, billets, slabs and similar articles, the present application being a continuation of my prior application filed August 7, 1939, Serial No. 288,893.

It is common practice to scarf or deseam such articles by means of an oxidizing flame, whereby cuts or furrows are formed to eliminate surface defects in the metal. Present methods, however, involve an extremely high consumption of oxygen, and have resulted in the formation of adhering fins along the edges of the cut or furrow.

These fins are generally highly ductile and become welded to the surface of the article, necessitating chipping or grinding for removal thereof, which latter operations require more time than the actual scarfing treatment itself. However, such fins or projections must be removed before the article is re-rolled to insure against the formation of scabs and slivers thereby.

The present invention contemplates a new method of scarfing wherein the oxidizing flame is confined to the region of the furrow in such a manner as to prevent the wasting of oxygen, and to prevent the formation of such adhering fins by a more complete oxidation of the metal during the scarfing.

I have discovered that scarfing in the manner stated may be carried out by enclosing or blanketing the oxidizing flame with a stream of a gaseous medium such as air under pressure, resulting in the desired removal of a suitable quantity of metal without the disadvantages heretofore encountered.

Also, the improved method of my invention so completely oxidizes the wash along the edges of the furrow that any fin formation is so embrittled as to be readily removed by brushing with a wire brush or the like.

My invention may be more readily understood from the following description taken in connection with the accompanying drawing, wherein:

Figure 1 is an elevational view of a gas and oxygen torch employed in the practice of my invention;

Figure 2 is an enlarged sectional view taken on the line II—II of Figure 1, and illustrating my method of scarfing;

Figure 3 is an end elevational view of the torch tip of Figure 2; and,

Figure 4 is a similar view of a modified form of tip.

Referring to the drawing, 2 designates generally a gas and oxygen torch for the mixing and combustion of a fuel gas and oxygen as supplied thereto by valve-controlled conduits or hoses 3 and 4, respectively. 5 designates a tip or nozzle therefor having the conventional annular series of fuel and oxygen mixture passages 6 converging about a central larger oxygen passage 7 at the terminal of the tip.

The torch illustrated is ignited and applied to the surface of the work, and either through preheating of the work, or by the use of a starting rod, the combustion of the metal of the work is instigated and maintained by the application of pure oxygen through the passage 7. 8 designates the conventional lever for regulating the torch oxygen valve and the flow of oxygen through said passage.

Under the former practice, the operator proceeds as above and moves the torch along the work to remove the defective portions thereof in accordance with observed surface defects. The wash of the metal of the furrow formed by this practice overflows and adheres to the surface of the work, producing large fins or superficial formations which must be removed at considerable cost, thereby rendering the scarfing cost unnecessarily high due to the time and labor involved in chipping or grinding the same away. Further, substantial quantities of oxygen are wasted to the atmosphere by such a process without being utilized in oxidation of the metal of the work.

To obviate these difficulties and to enhance the oxidation of the scarfing process, I prefer to envelop or blanket the oxidizing flame by a stream of a gaseous medium such as air, to confine the scarfing action to the immediate region of the work engaged by the flame.

One form of apparatus for carrying out my improved method may be applied directly to the torch 2, including an air or gas jacket 9 surrounding the tip 5 and secured thereto. The jacket 9 includes an annular recess or chamber 10 connected with a source of supply by conduit 11 and a control valve 12 carried by the torch 2. 13 are passageways or ports extending from the chamber 10 to the terminal of the tip 5 and arranged in annular series around or partly around the tip passages 6 and 7.

Figure 3 illustrates the disposition of said passages 13 half-way around the tip terminal on that side of the torch whereby upon inclining the torch as in Figure 2, and scarfing by moving said torch from right to left, as shown by the arrow, the air or gas discharging from the passages 13 will flow over and on each side of the torch flame into contact with the surface of the work immediately in advance of and laterally on opposite sides of the region of impingement of the flame on the work.

The layer or curtain of air or other gas so applied will effect a material saving of oxygen due to the fact that the stream of the latter is confined to the region of impingement with the work and provides a greater oxidizing action since a minimum amount of the oxygen escapes to the atmosphere. The increased oxidation so completely oxidizes the metal of the wash that all portions thereof which tend to be displaced along the edges of the furrow will be so embrittled as to be readily broken away, as by brushing with a wire brush or the like.

I have found that the most satisfactory results may be obtained by supplying the air or other gas for confining the oxidizing flame at a pressure greater than that of the oxygen of the oxidizing flame, and in practice have employed air at one hundred pounds per square inch for an oxygen pressure of sixty pounds per square inch.

Figure 4 illustrates a modification wherein the tip jacket 9 is provided with a complete annular series of passages 13, whereby the torch may be inclined for use as in Figure 2, or oppositely inclined, the uppermost passages 13 supplying the confining layer or stream of air or gas, the lowermost passages adjacent the surface being treated having no detrimental effect upon the desired action as hereinbefore described. In this manner, the torch may be readily reversed for scarfing in either direction, and is adapted to right or left handed operators.

While I have shown and described my invention in connection with manual scarfing operations, it will be apparent that the same is readily adaptable to machine scarfing as well, wherein the torch or torches are usually held stationary and the work moved relatively thereto.

Various changes and modifications are contemplated within the scope of the following claims.

I claim:

1. The method of scarfing articles of the character described which includes impinging an oxidizing flame upon and at an angle to the surface of the article, effecting a relative movement of the flame and article, completely enveloping at least the upper portion of the flame by a separate overlying layer of air flowing substantially in the direction of the flame, and impinging the air upon the said surface immediately in advance of and along the sides of the region of contact of said flame and surface.

2. The method of scarfing articles of the character described which includes impinging an oxidizing flame upon and at an angle to the surface of the article, effecting a relative movement of the flame and article, completely enveloping at least the upper portion of the flame by a separate overlying layer of air flowing substantially in the direction of the flame, and impinging the air upon the said surface immediately in advance of and along the sides of the region of contact of said flame and surface, said air being supplied at a pressure exceeding that of the oxygen of the oxidizing flame.

WILLIAM VAN TRIEST.